US006660150B2

(12) United States Patent
Conlan et al.

(10) Patent No.: US 6,660,150 B2
(45) Date of Patent: *Dec. 9, 2003

(54) SEPARATION OF MICROMOLECULES

(75) Inventors: Brendon Francis Conlan, Lane Cove (AU); Andrew Mark Gilbert, Eastwood (AU); Lucy Jane Ryan, Baulkham Hills (AU); Chenicheri Hariharan Nair, Homebush Bay (AU)

(73) Assignee: Gradipore Limited, Frenchs Forest (AU)

(*) Notice: Subject to any disclaimer, the term of this patent is extended or adjusted under 35 U.S.C. 154(b) by 0 days.

This patent is subject to a terminal disclaimer.

(21) Appl. No.: 09/834,462

(22) Filed: Apr. 13, 2001

(65) Prior Publication Data

US 2002/0148730 A1 Oct. 17, 2002

(30) Foreign Application Priority Data

Apr. 14, 2000 (AU) .............................................. PQ6914

(51) Int. Cl.$^7$ .......................... B01D 35/06; B01D 61/42; B01D 69/00; B01D 71/00; C02F 1/40; C02F 11/00; C25B 11/00; C25B 13/00; C25B 9/00; F25B 41/02

(52) U.S. Cl. ........................ 204/627; 204/624; 204/518

(58) Field of Search ................................ 204/518, 627, 204/624

(56) References Cited

U.S. PATENT DOCUMENTS

| 3,878,564 A | 4/1975 | Yao et al. |
| 4,036,748 A | 7/1977 | Knickel et al. |
| 4,045,337 A | 8/1977 | Knickel et al. |
| 4,045,455 A | 8/1977 | Vogel |
| 4,069,215 A | 1/1978 | Elfert et al. |
| 4,115,225 A | 9/1978 | Parsi |
| 4,123,342 A | 10/1978 | Ahlgren |
| 4,174,439 A | 11/1979 | Rauenbusch et al. |
| 4,196,304 A | 4/1980 | Naumann |
| 4,204,929 A | 5/1980 | Bier |
| 4,217,227 A | 8/1980 | Elfert et al. |
| 4,238,306 A | 12/1980 | Perry et al. |
| 4,238,307 A | 12/1980 | Perry et al. |
| 4,252,652 A | 2/1981 | Elfert et al. |
| 4,259,079 A | 3/1981 | Blum |

(List continued on next page.)

FOREIGN PATENT DOCUMENTS

| DE | 41 16 179 A1 | 11/1992 |
| EP | 0 369 945 A2 | 11/1989 |
| GB | 2 118 975 | 2/1993 |
| WO | WO 97/14486 | 4/1997 |
| WO | WO 98/21384 | 5/1998 |
| WO | WO 98/43718 | 10/1998 |

*Primary Examiner*—Mark L. Bell
*Assistant Examiner*—Jennine Brown
(74) *Attorney, Agent, or Firm*—Baker & McKenzie

(57) ABSTRACT

An apparatus and method for the separation of molecules having a molecular mass from about 200 to 5000 Da, particularly micromolecules having a molecular mass of less than 5000 Dalton.

The apparatus contains an anode,
a cathode disposed between the anode and the separation membrane that defines a first interstitial volume therebetween.

A first restriction membrane disposed between the anode and the separation membrane defines a second interstitial volume therebetween.

Upon application of the voltage potential, a selected separation product is removed from the sample constituent through the separation membrane, and provided to the other of the first and second interstitial volumes.

22 Claims, 6 Drawing Sheets

U.S. PATENT DOCUMENTS

| | | | |
|---|---|---|---|
| 4,269,967 A | 5/1981 | Elfert et al. | |
| 4,276,140 A | 6/1981 | Jain | |
| 4,279,724 A | 7/1981 | Hearn et al. | |
| 4,299,677 A | 11/1981 | Venkatasubramanian et al. | |
| 4,322,275 A | 3/1982 | Jain | |
| 4,362,612 A | 12/1982 | Bier | |
| 4,376,023 A | 3/1983 | Venkatsubramanian et al. | |
| 4,381,232 A | 4/1983 | Brown | |
| 4,383,923 A | 5/1983 | Elfert | |
| 4,396,477 A | 8/1983 | Jain | |
| 4,441,978 A | 4/1984 | Jain | |
| 4,533,447 A | 8/1985 | Meldon | |
| 4,608,140 A | 8/1986 | Goldstein | |
| 4,661,224 A | 4/1987 | Goldstein et al. | |
| 4,673,483 A | 6/1987 | Mandle | |
| 4,711,722 A | 12/1987 | Toyoshi et al. | |
| 4,746,647 A | 5/1988 | Svenson | |
| 4,780,411 A | 10/1988 | Piejko et al. | |
| 4,897,169 A | 1/1990 | Bier et al. | |
| 4,963,236 A | 10/1990 | Rodkey et al. | |
| 5,043,048 A | 8/1991 | Muralidhara | |
| 5,080,770 A | 1/1992 | Culkin | |
| 5,082,548 A | 1/1992 | Faupel et al. | |
| 5,087,338 A | 2/1992 | Perry et al. | |
| 5,096,547 A | 3/1992 | Klotz et al. | |
| 5,114,555 A | 5/1992 | Stimpson | |
| 5,127,999 A | 7/1992 | Klotz et al. | |
| 5,160,594 A | 11/1992 | Huff et al. | |
| 5,173,164 A | 12/1992 | Egen et al. | |
| 5,185,086 A | 2/1993 | Kaali et al. | |
| 5,238,570 A | 8/1993 | Hugl et al. | |
| 5,277,774 A | 1/1994 | Shmidt et al. | |
| 5,336,387 A | 8/1994 | Egen et al. | |
| 5,340,449 A * | 8/1994 | Shukla | 204/464 |
| 5,352,343 A | 10/1994 | Bailes et al. | |
| 5,407,553 A | 4/1995 | Herron et al. | |
| 5,420,047 A | 5/1995 | Brandt et al. | |
| 5,437,774 A | 8/1995 | Lautsen | |
| 5,441,646 A | 8/1995 | Heller et al. | |
| 5,490,939 A | 2/1996 | Gerigk et al. | |
| 5,503,744 A | 4/1996 | Ikematsu et al. | |
| 5,504,239 A | 4/1996 | Mehl et al. | |
| 5,558,753 A | 9/1996 | Gallagher et al. | |
| 5,561,115 A | 10/1996 | Tenold | |
| 5,565,102 A | 10/1996 | Brandt et al. | |
| 5,610,285 A | 3/1997 | Lebing et al. | |
| 5,662,813 A | 9/1997 | Sammons et al. | |
| 5,723,031 A | 3/1998 | Durr et al. | |
| 5,733,442 A | 3/1998 | Shukla | |
| 5,736,023 A | 4/1998 | Gallagher et al. | |
| 5,868,938 A | 2/1999 | Bomer et al. | |
| 5,891,736 A | 4/1999 | Chapoteau et al. | |
| 5,906,724 A | 5/1999 | Sammons et al. | |
| 5,938,904 A | 8/1999 | Bader et al. | |
| 5,986,075 A | 11/1999 | DuBose et al. | |
| 6,093,296 A | 7/2000 | Soane et al. | |
| 6,117,297 A | 9/2000 | Goldstein | |
| 6,129,842 A | 10/2000 | Kostanian | |
| 6,171,825 B1 | 1/2001 | Chan et al. | |
| 6,284,115 B1 * | 9/2001 | Apffel | 204/518 |
| 6,402,913 B1 * | 6/2002 | Gilbert et al. | 204/450 |

* cited by examiner

SEPARATION OF MICROMOLECULES

BACKGROUND OF THE INVENTION

The present invention relates to apparatus and methods for the separation of molecules, particularly micromolecules having a molecular mass of less than about 5000 Dalton.

There are increasing numbers of micromolecules being used as food and diet supplements, pharmaceuticals and neutraceuticals. Increasing numbers of vitamins, co-factors, plant and microbial extracts are also being developed and used for human and animal consumption. As many of these compounds are micromolecules (having a molecular mass of less than about 5000 Dalton (Da)), there is a need to develop methods to separate or purify these compounds in a fast and economical manner. Traditional separation methods for micromolecules can alter or denature these compounds. Separation methods for larger molecules typically are not considered suitable for use in micromolecule separation. Furthermore, traditional methods can be quite time consuming, expensive and difficult to scale up commercially.

In the past, a preparative electrophoresis technology for macromolecule separation which utilises tangential flow across a polyacrylamide membrane when a charge is applied across the membrane was used to separate micromolecules. The general design of the earlier system facilitated the purification of proteins and other macromolecules under near native conditions. The technology is bundled into a cartridge comprising several membranes housed in a system of specially engineered grids and gaskets which allow separation of macromolecules by charge and/or molecular weight. The system can also concentrate and desalt/dialyse at the same time. The multi-modal nature of the system allows this technology to be used in a number of other areas especially in the production of biological components for medical use. The technology isolates macromolecules using the duality of charge and size. However, the technology could not be extended to the isolation of molecules below about 5000 Da. This meant that while molecules smaller than 5000 Da could be removed using at least charge-based separation, the resulting target molecule could not be captured.

The separation of micromolecules, molecules deemed to be less than about 5 kDa, was previously thought not to be possible using electrophoresis technology devised to separate macromolecules. This was due to the limit in pore size of membranes normally used in the systems. For example, the smallest cut-off produced in polyaccrylamide membranes is about 5 kDa which will retain any molecule larger than 5 kDa.

There were several problems encountered in the separation of micromolecules using an unmodified electrophoresis system. Difficulty retaining micromolecules in the system has been overcome with the addition of combinations of membranes. However, these membranes themselves posed problems in that they are not designed to retain liquids and can produce large levels of electro-endo-osmosis. The liquid retention problem has been solved by backing the membranes with the hydrogel polyacrylamide membranes, which also helped to reduce the electro-endo-osmosis levels.

It is desirable to have a preparative electrophoresis system which can efficiently and effectively remove micromolecules.

The subject invention overcomes the above limitations and others, and teaches an electrophoresis system, which can be scaled up for preparative applications, which apparatus can efficiently and effectively separate micromolecules.

SUMMARY OF THE INVENTION

In accordance with the present invention, there is provided an electrophoresis system which efficiently and effectively separate micromolecules.

Further, in accordance with the present invention, there is provided an apparatus for separating micromolecules by electrophoretic separation, the apparatus comprising:

(a) an anode;

(b) a cathode disposed relative to the anode so as to be adapted to generate an electric field in an electric field area therebetween upon application of a voltage potential between the anode and the cathode;

(c) a separation membrane disposed in the electric field area;

(d) a first restriction membrane disposed between the anode and the separation membrane so as to define a first interstitial volume therebetween;

(e) a second restriction membrane disposed between the cathode and the separation membrane so as to define a second interstitial volume therebetween; and (f) means adapted to provide a sample constituent in a selected one of the first and second interstitial volumes; wherein upon application of the voltage potential, a selected separation product is removed from the sample constituent, thorough the separation membrane, and provided to the other of the first and second interstitial volume and wherein a micromolecule is capable of being retained in at least one of the interstitial volumes.

Still further, in accordance with the present invention, there is provided an apparatus for separating micromolecules by electrophoresis, the apparatus comprising:

(a) an anode buffer compartment and a cathode buffer compartment;

(b) electrodes positioned in the buffer compartments;

(c) a first chamber and a second chamber positioned on either side of an ion-permeable separation membrane having a defined molecular mass cut-off, the first chamber and the second chamber being positioned between the anode and the cathode buffer compartments and separated by an ion-permeable restriction membrane positioned on each side of the separation membrane, the restriction membrane(s) allowing flow of ions into and out of the compartments and chambers under the influence of an electric field but substantially restrict movement of at least one micromolecule type from the second chamber into the buffer compartment.

Preferably, the buffer compartments, the first chamber and the second chamber are configured to allow flow of the respective buffer, first and second solutions forming streams. In this form, large volumes can be processed quickly and efficiently. The solutions are typically moved or recirculated through the compartments and chambers from respective reservoirs by pumping means. Peristaltic pumps have been found to be particularly suitable for moving the fluids.

Preferably, the ion-permeable separation membrane has a molecular mass cut-off greater than the molecular mass of the micromolecule to be separated.

An advantage of the present invention is that micromolecules can be separated efficiently and effectively using preparative electrophoresis under near native conditions which results in higher yields and excellent recovery.

Another advantage of the present invention is that the system is suitably used in a number of other areas, especially in the production of biological components for medical use.

Another advantage of the present invention is that the system can be suitably configured to remove biological contaminants at the point of separation.

These and other advantages and benefits of the invention will be apparent to those skilled in the art upon reading and understanding of the following detailed description.

DETAILED DESCRIPTION OF THE INVENTION

This invention is directed to an apparatus and method for the separation of molecules, particularly micromolecules having a molecular mass of less than about 5000 Dalton. The present invention is directed to an apparatus for separating micromolecules by electrophoretic separation, the apparatus comprising:

(a) an anode;
(b) a cathode disposed relative to the anode so as to be adapted to generate an electric field in an electric field area therebetween upon application of a voltage potential between the anode and the cathode;
(c) a separation membrane disposed in the electric field area;
(d) a first restriction membrane disposed between the anode and the separation membrane so as to define a first interstitial volume therebetween;
(e) a second restriction membrane disposed between the cathode and the separation membrane so as to define a second interstitial volume therebetween; and
(f) means adapted to provide a sample constituent in a selected one of the first and second interstitial volumes;
wherein upon application of the voltage potential, a selected separation product is removed from the sample constituent, thorough the separation membrane, and provided to the other of the first and second interstitial volumes, and wherein a micromolecule is capable of being retained in at least one of the interstitial volumes.

In a preferred embodiment, the present invention is directed an apparatus for separating micromolecules by electrophoresis, the apparatus comprising:

(a) an anode buffer compartment and a cathode buffer compartment;
(b) electrodes positioned in the buffer compartments;
(c) a first chamber and a second chamber positioned on either side of an ion-permeable separation membrane having a defined molecular mass cut-off, the first chamber and the second chamber being positioned between the anode and the cathode buffer compartments and separated by an ion-permeable restriction membrane positioned on each side of the separation membrane, the restriction membrane(s) allowing flow of ions into and out of the compartments and chambers under the influence of an electric field but substantially restrict movement of at least one micromolecule type from the second chamber into the buffer compartment.

Preferably, the buffer compartments, the first chamber and the second chamber are configured to allow flow of the respective buffer, first and second solutions forming streams. In this form, large volumes can be processed quickly and efficiently. The solutions are typically moved or recirculated through the compartments and chambers from respective reservoirs by pumping means. Peristaltic pumps have been found to be particularly suitable for moving the fluids.

Preferably, the ion-permeable separation membrane has a molecular mass cut-off greater than the molecular mass of the micromolecule to be separated.

Figure 11:
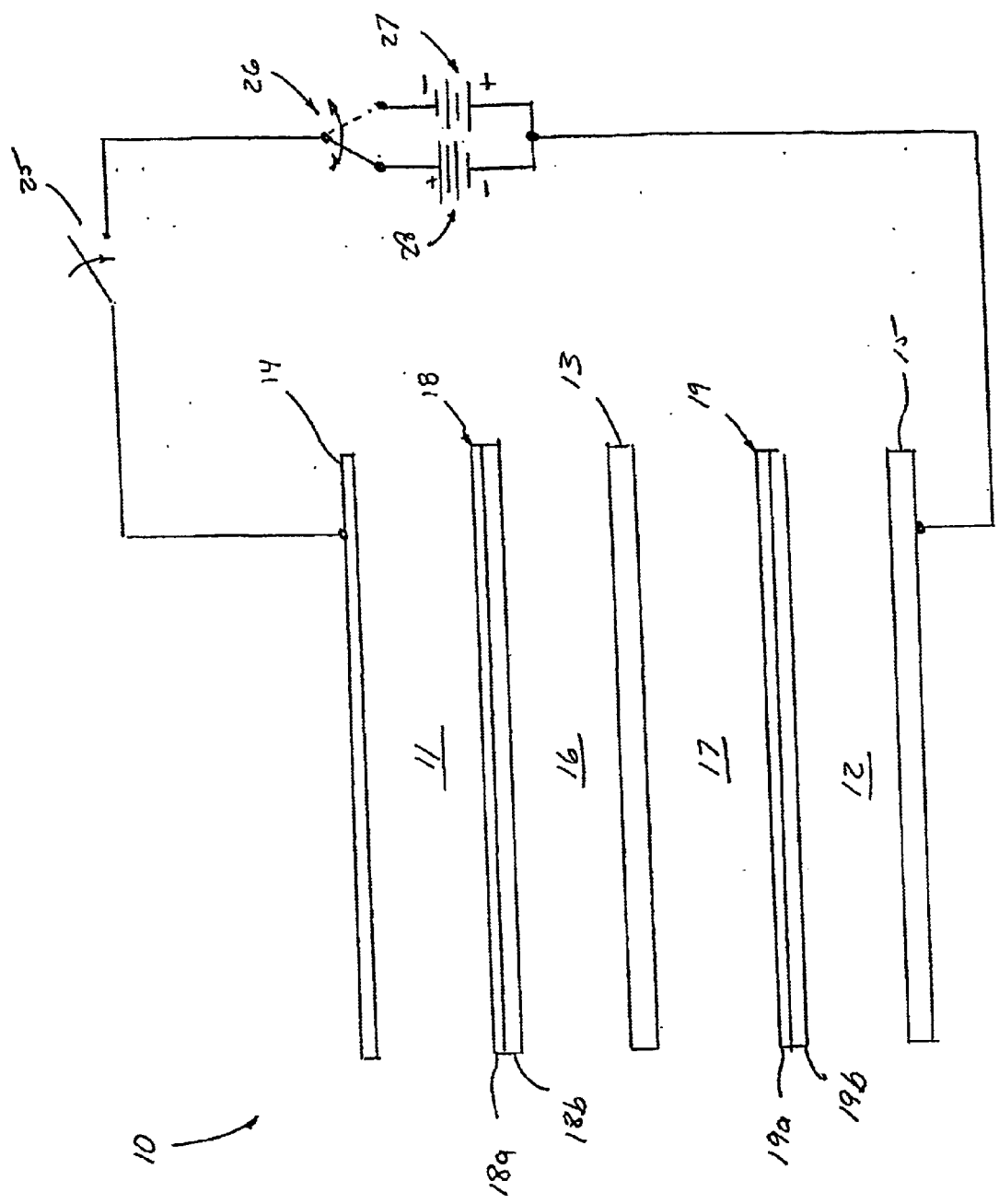
FIG. 11 is a schematic view of a preferred embodiment of the separation apparatus of the present invention.

FIG. 11 shows a preferred embodiment of the apparatus 10 of the present invention. The apparatus 10 includes an anode buffer zone or compartment 11 and a cathode buffer zone or compartment 12 separated by an ion-permeable separation barrier 13. Electrodes 14 and 15 are provided inside the buffer zones or compartments so as to be on opposite sides of the separation membrane 13. It is understood, however, that in another embodiment, the electrodes are positioned outside the buffer compartments. The electrodes are used to apply an electrophoretic potential across the separation membrane.

A first chamber 16 is positioned between the anode buffer compartment 11 and the separation membrane 13. The first chamber is defined on one side by the separation membrane 13 and on the other side by a first restriction membrane 18. It is understood, however, that in another embodiment, the first chamber is positioned between the cathode buffer compartment and the separation membrane. In one embodiment, the first restriction membrane is comprised of at least two membranes 18 and 18b having distinctive pore sizes.

A second chamber 17 is positioned between the cathode buffer compartment 12 and the separation barrier 13. The second chamber is defined on one side by the separation membrane 13 and on the other side by a second restriction membrane 19 on the other side. It is understood, however, that in another embodiment, the second chamber is positioned between the anode buffer compartment and the separation membrane. In one embodiment, the second restriction membrane is comprised of at least two membranes 19a and 19b having distinctive pore sizes.

The apparatus is further comprised of switch 25 for selection of the application of a voltage source (such as to turn the voltage source off or have resting periods), switch 26 to switch current direction for cathode/anode or to have reversal periods, and voltage sources 27 and 28.

The anode buffer compartment and the cathode buffer compartment are supplied with suitable buffer solutions by any suitable means. A mixture comprising micromolecules is supplied directly to the first chamber by any suitable means. The micromolecules are separated from the second chamber by any suitable means.

Preferably, the buffer compartments, the first chamber and the second chamber are configured to allow flow of the respective buffer, sample and product solutions forming streams. In this form, large volumes can be processed quickly and efficiently. The solutions are typically moved or recirculated through the compartments and chambers from respective reservoirs by pumping means. In a preferred embodiment, peristaltic pumps are used as the pumping means for moving the fluids.

The buffer, sample or product solutions are cooled by any suitable means to ensure no inactivation of the micromolecules occurs during the separation process and to maintained a desired temperature of the apparatus while in use.

Preferably, in order to collect and concentrate the separated micromolecules, solution in the product chamber or stream is collected and replaced with suitable solvent to ensure that electrophoresis can continue.

Preferably, at least one restriction membrane is formed as a composite or sandwich arrangement with at least two materials. Preferably, at least one restriction membrane is formed as a sandwich arrangement with at least two layers of material. In this preferred form, the sandwich arrangement includes an inner layer (facing the separation membrane in the first and second solvent streams, respectively) comprising a membrane having a pore size with a molecular mass cut-off less than the about 5000 Da and an outer layer comprising a membrane having a molecular mass cut-off of greater than about 5000 Da.

In a preferred form, the inner layer is made from an ultrafiltration, electrodialysis or haemodialysis material and the outer layer is made from polyacrylamide. In this preferred arrangement, the outer layer provides some structural support for the filtration membrane while preventing unwanted movement of fluid. The pore size of the filtration membrane is selected according to the size of the micromolecule to be separated such that the micromolecule cannot pass through the membrane. Typically, the molecular mass cut-off of the filtration membrane is between about 100 Da to 5000 Da. More preferably, the molecular mass cut-off is around 200 Da.

Hydrogel ion-permeable separation membranes (an ultrafiltration, electrodialysis and/or haemodialysis membranes coated with polyacrylamide) would be an alternative membrane type suitable for the present invention. Such membranes are possible to manufacture, but are currently not commercially available.

Preferably, the ion-permeable separation barrier is a membrane made from polyacrylamide and having a molecular mass cut-off from about 5 to 1000 kDa. The size of the separation membrane cut-off will depend on the sample being processed and the other molecules in the mixture.

The restriction barriers or membranes positioned adjacent the sample and product chambers can have the same molecular mass cut-off or different cut-offs therefore forming an asymmetrical arrangement. Typically, the restriction membrane separating the product chamber from the buffer compartment is formed in a sandwich configuration.

The distance between the electrodes can have an effect on the separation or movement of micromolecules through the barriers. It has been found that the shorter the distance between the electrodes, the faster the electrophoretic movement of micromolecules. A distance of about 6 cm has been found to be suitable for a laboratory scale apparatus. For scale up versions, the distance will depend on the number and type of separation membranes, the size and volume of the chambers for samples, buffers and separated products. Preferred distances would be in the order of 6 cm to about 10 cm. The distance will also relate to the voltage applied to the apparatus. The effect of the electric field is based on the equation:

$$e=V/d$$

(e=electric field, V=voltage, d=distance)

Therefore, smaller distances between the electrodes are preferred. Preferably, the distance between the electrodes should decrease in order to increase electric field strength, thereby further improving transfer rates.

Flow rate of sample/buffer can have an influence on the separation of micromolecules. Rates of milliliters per hour up to liters per hour can be used depending on the configuration of the apparatus and the sample to be separated. Currently in a laboratory scale instrument, the preferred flow rate is about 20±5 mL/min. However, flow rates ranging from about 0 to about 50,000 mL/min are also used across the various separation regimes. In some embodiments the maximum flow rate is higher, depending on the pumping means and size of the apparatus. The flow rate is dependent on the product to be transferred, efficiency of transfer, pre- and post-positioning with other applications.

Voltage and/or current applied can vary depending on the separation. Typically up to several thousand volts may be used but choice and variation of voltage will depend on the configuration of the apparatus, buffers and the sample to be separated. In a laboratory scale instrument, the preferred voltage is about 250 V. However, depending on transfer, efficiency, scale-up and particular method about 0 to about 5000 are used. Higher voltages may also be considered, depending on the apparatus and sample to be treated.

A number of first and second chambers could be stacked in the one apparatus for use in a scale-up device.

A single stream configuration can be produced where the second chamber forms a buffer chamber. In this configuration, contaminants would be moved out of the first chamber into the buffer compartments and the product of interest retained in the first chamber. In single stream configuration, the membranes can have either a symmetric or asymmetric arrangements. The present invention also includes these embodiments.

In use, a sample containing one or more micromolecules is added to the first chamber and an electric potential is applied to cause movement of at least one micromolecule from the sample through the separation membrane into the second chamber while the restriction membranes prevent movement of micromolecules from the first or the second chambers into the respective electrophoresis buffer chambers. Preferably, the micromolecule is removed and collected from the product chamber.

In a second aspect, the present invention provides a separation cartridge suitable for use in an electrophoresis apparatus for separating micromolecules, the cartridge comprising:

(a) a housing;

(b) an ion-permeable separation membrane having a defined molecular mass cut-off positioned in the housing;

(c) an ion-permeable restriction membrane positioned on either side of the separation membrane in the housing and spaced to form a first chamber and second chamber on either side of the separation membrane, wherein the restriction membrane is adapted to allow flow of ions into and out of the compartments and chambers under the influence of an electric field but substantially restrict movement of at least one micromolecule type from the second chamber. In a preferred embodiment, the cartridge further includes:

(d) electrodes positioned in the housing on the outer sides of the restriction barriers.

Preferably, the separation barrier is a membrane composed of polyacrylamide and having a molecular mass cut-off from about 5 to 1000 kDa.

Preferably, the ion-permeable separation membrane has a molecular mass cut-off greater than the molecular mass of the micromolecule to be separated.

At least one restriction membrane is preferably formed as a sandwich or composite arrangement of membranes with at least two materials. Preferably, the sandwich arrangement includes an inner layer comprising a restriction membrane having a pore size with a molecular mass cut-off less than about 5000 Da and an outer layer comprising a restriction membrane having a molecular mass cut-off of greater than about 5000 Da.

In a preferred form, the inner layer is made from an ultrafiltration, electrodialysis or haemodialysis material and the outer layer is made from polyacrylamide. In this preferred arrangement, the outer layer provides some structural support for the filtration membrane while preventing unwanted movement of fluid. The pore size of the filtration membrane is selected according to the size of the micromolecule to be separated such that the micromolecule cannot pass through the membrane. Typically, the molecular mass cut-off of the filtration membrane is between about 100 Da to 5000 Da. More preferably, the molecular mass cut-off is around 200 Da.

In a third aspect, the present invention provides a method of separating a micromolecule from a liquid sample, the method comprising:

(a) providing an electrophoresis apparatus according to the first aspect of the present invention;

(b) placing the sample in the first chamber of the apparatus; selecting a solvent for the first chamber having a pH such that the micromolecule to be separated is charged;

(c) applying an electric potential between the first and second chambers causing movement of micromolecules in the first chamber through the separation membrane into the second chamber while unwanted molecules are substantially prevented from entering the second chamber;

(d) optionally, periodically stopping and reversing the electric potential to cause movement of molecules having entered the separation membrane to move back into the first chamber, while substantially not causing any micromolecules that have entered the second chamber to re-enter first chamber; and (e) maintaining steps (c) and optionally (d) until the desired amount of micromolecules are moved to the second chamber.

The micromolecule can be any micromolecule capable of receiving or having a charge. Examples include, but not limited to, biotin, Brilliant Blue FCF (BB FCF), azorubine, phytoestrogen, digoxigenin, hormones, cytokines, dyes, vitamins, chemicals, neutraceuticals, pharmaceuticals along with food and diet supplements.

The sample can contain one or more micromolecules of interest. Examples include, but are not limited to, crude extracts, microbial cultures, cell lysates, cellular products, chemical processing mixtures, cell culture media, plant products or extracts.

Solvent in the form of buffers that have been found to be particularly suitable for the method according to the present invention are Tris Borate around pH 9. It will be appreciated, however, that other buffers or solvents would also be suitable, depending on the separation. The concentration of the selected buffers can also influence or effect the movement of micromolecules through the separation barrier. Typically concentrations of about 10 mM to about 200 mM, more preferably 20 mM to 80 mM, have been found to be particularly suitable. Almost any buffers and/or solvents can be used with the present invention. The buffers and/or solvents that can be used are procedure/method/separation dependent. The concentration of the buffer and/or solvent is dependent upon the application/separation/procedure.

Reversal of current is an option but another embodiment is a resting period. Resting (a period without an electric potential being applied, but pumps remain on) is an optional step that can replace or be included before or after an optional electrical potential reversal. This reversal technique is often practised for protein separation work as an alternative to reversing the potential.

One benefit of the method according to the present invention is the possibility of scale-up without denaturing or adversely altering the physical or biological properties of the micromolecule.

In a fourth aspect, the present invention provides a micromolecule purified or separated by the method according to the third aspect of the present invention.

Preferably the micromolecule is less than 5000 Da. Examples include, but are not limited to, biotin, Brilliant Blue FCF (BB FCF), azorubine, phytoestrogen, digoxigenin, hormones, cytokines, dyes, vitamins, chemicals, neutraceuticals, pharmaceuticals along with food diet supplements, and combinations thereof.

In a fifth aspect, the present invention relates to use of the micromolecule according to the fourth aspect of the present invention in dietary, medical and veterinary applications.

Throughout this specification, unless the context requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps. Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed in Australia before the priority date of each claim of this application.

In order that the present invention may be more clearly understood, preferred forms will be described with reference to the following drawings and examples.

MODES FOR CARRYING OUT THE INVENTION

The separation of micromolecules, molecules deemed to be less than about 5 kDa, was previously thought not to be possible using electrophoresis technology devised to separate macromolecules. This was due to the limit in pore size of membranes normally used in the systems. For example, the smallest cut-off produced in polyacrylamide membranes is about 5 kDa which will retain any molecule larger than 5 kDa. The present invention results from modification of earlier technology to be capable of separating micromolecules by using some barriers or membranes other than polyacrylamide membranes traditionally used. It has been found that when commercially available membranes in the form of ultrafiltration, electrodialysis and haemodialysis membranes are used as separation or restriction membranes, the size of molecule that can be dealt with, is significantly smaller than previously thought.

In order to separate and purify micromolecules, hydrogel polyacrylamide membranes traditionally used in the earlier system's cartridge were placed as backing to a commercial membrane with the desired pore size. The polyacrylamide membrane is useful to prevent unregulated fluid movement across the membranes, whilst the commercial membrane is used to retain the smaller molecular species within the sample or product streams or chambers. The membranes used for this work were Pall Gelman Omega ultrafiltration membranes. These ultrafiltration membranes are available commercially with pore sizes ranging from hundreds of kDa down to 1000 Da.

Another surprising finding was that the relative pore size of the ultrafiltration membranes was found to be different when used in the sandwich arrangement than when used in an ultrafiltration unit. The relative pore size appears to be smaller than the stated size. Thus it has been shown to be possible to retain molecules as small as 200 Dalton within the modified system.

When an apparatus is operated with the traditional polyacrylamide membranes used for macromolecule purification or separation, small molecules under 5 kDa tend to transfer from the sample stream into the product stream where they remain transiently. These molecules then move through the bottom restriction membrane into the buffer stream where they are lost.

Experiments were carried out on several model molecules which have varied structure and function. The use of these micromolecules demonstrates that a wide variety of molecules could be used within the system. Two molecules studied were Bis[4-(N-ethyl-N-3-sulfophenylmethyl) aminophenyl]-2-sulfophenylmethylium disodium salt (Brilliant Blue FCF) which has a molecular mass of 793 Dalton, and Disodium 2-(4-Sulfo-1Napthylazo)-1-Napthol-4-Sulfonate (Azorubine) which has a molecular mass of 502 Dalton. Two other molecules were also investigated, one being Vitamin H (Biotin) and the other a small phytoestrogen separated from red leaf clover (supplied by Novogen, Sydney Australia). Brilliant Blue FCF and Azorubine are two chemicals currently used in the food industry as colouring agents. Biotin has several uses, first as a necessary vitamin in the human diet and secondly, but not insignificantly, as a labelling agent in scientific assays. Phytoestrogens are separated commercially from many sources primarily soy and clover where they are made into herbal and pharmaceutical medicines.

Experiments using Brilliant Blue FCF (BB-FCF), Azorubine, Biotin and a Phytoestrogen all confirmed that standard polyacrylamide electrophoresis membranes do not retain these micromolecules during a separation. These molecules are very small and definitely considered micromolecules; BB-FCF (793 Da), Azorubine (502 Da), Biotin (244 Da) and a Phytoestrogen (~200 Da).

Experiments using BB-FCF and Azorubine with a pH 9.0 buffer and a cartridge sandwich of 5-5-5 kDa polyacrylamide membranes (upper restriction 5 kDa, separation membrane 5 kDa, lower restriction 5 kDa) showed that complete transfer from the sample stream occurs in a short period of time. The macromolecules build slightly in the product stream before passing completely into the buffer stream where they are diluted so highly that they are lost to analysis. This is also true for the Phytoestrogen and for Biotin. FIGS. 1, 2, 3, and 4 show the transient build up and eventual loss of BB-FCF, Azorubine, Biotin, and the Phytoestrogen, within the an apparatus used for macromolecule separation having only polyacrylamide membranes. The time taken for the micromolecules to completely transfer out of the system varies for each molecule. It is likely that this is due to the difference in charge to mass ratios between the molecules.

Use of traditional polyacrylamide membranes was therefore found not a feasible method for the separation of molecules under about 5 kDa. This led to the novel step of trialing new membranes, previously not considered useful for prior art systems. These commercially available membranes are manufactured to be used under conditions of high pressure where they act purely as a filter. This means that the membranes are not always "water tight" when used in the earlier system. Only those membranes with a very small pore size retain liquid under the low pressures used in the earlier system. These ultrafiltration membranes are ideal for use in a preparative electrophoresis system unless they are backed with a membrane designed to stop or reduce transfer of liquid but allow ion and charged molecule transfer under an electric filed.

It was found that alternative membrane types could be used when they were backed with a hydrogel membrane to give fluid retention. This double layering not only prevented fluid leakage across the membranes but also significantly reduced the levels of endo-osmosis produced. Endo-osmosis levels are a big consideration in the design and use of membranes for preparative electrophoresis systems. Particular chemistries of membranes can produce such large changes in fluid volumes from one stream to another via electro-endo-osmosis so cannot be used.

The separation and retention of very small molecules was made possible in the apparatus according to the present invention by using a small pore sized ultrafiltration membrane (Pall Gelman Omega) as the bottom restriction in combination with a polyacrylamide membrane. The use of a 1 kDa Omega ultrafiltration membrane in this position allowed the capture of molecules as small as 200 Da. Experiments were carried out again using BB-FCF, Azorubine, Biotin and a Phytoestrogen.

The following cartridge configuration was used for the separations:

5 kDa polyacrylamide restriction membrane
Support Grid
10 kDa polyacrylamide separation membrane
Support Grid
1 kDa ultrafiltration restriction membrane
5 kDa polyacrylamide restriction membrane It was possible to move BB-FCF, Azorubine and Biotin using the above cartridge configuration from the sample stream to the product stream where they were trapped and collected. The Phytoestrogen experiments used a 5 kDa ultrafiltration membrane to retain the molecules in the product stream.

Figure 5:
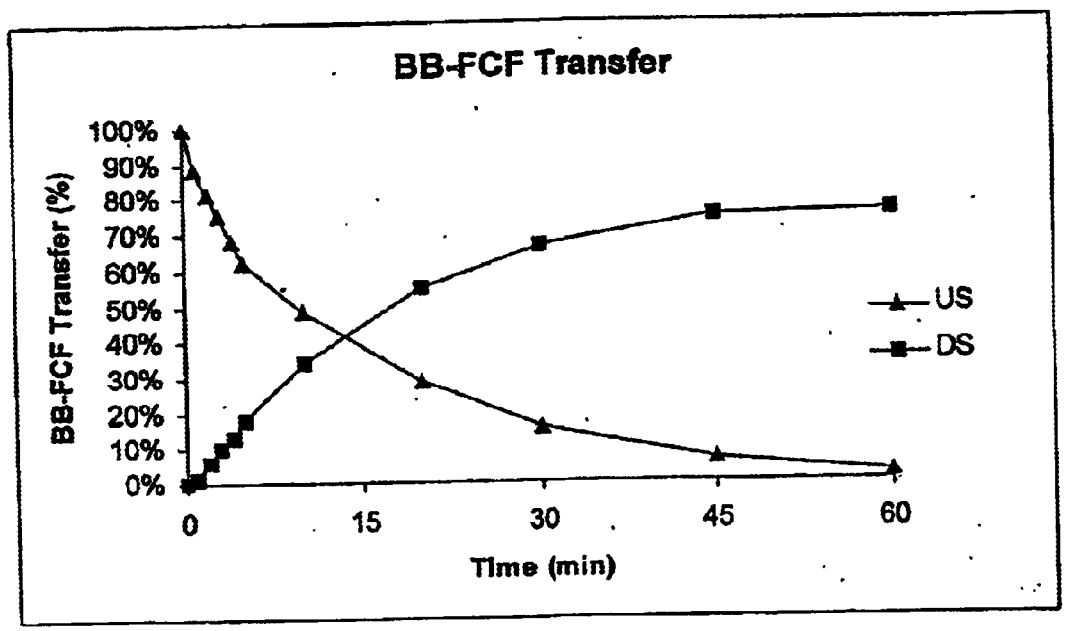
FIG. 5 shows BB-FCF separated with 74% yield in one hour. The molecules were readily captured using the 1 kDa ultrafiltration membrane in the cartridge.
Figure 6:
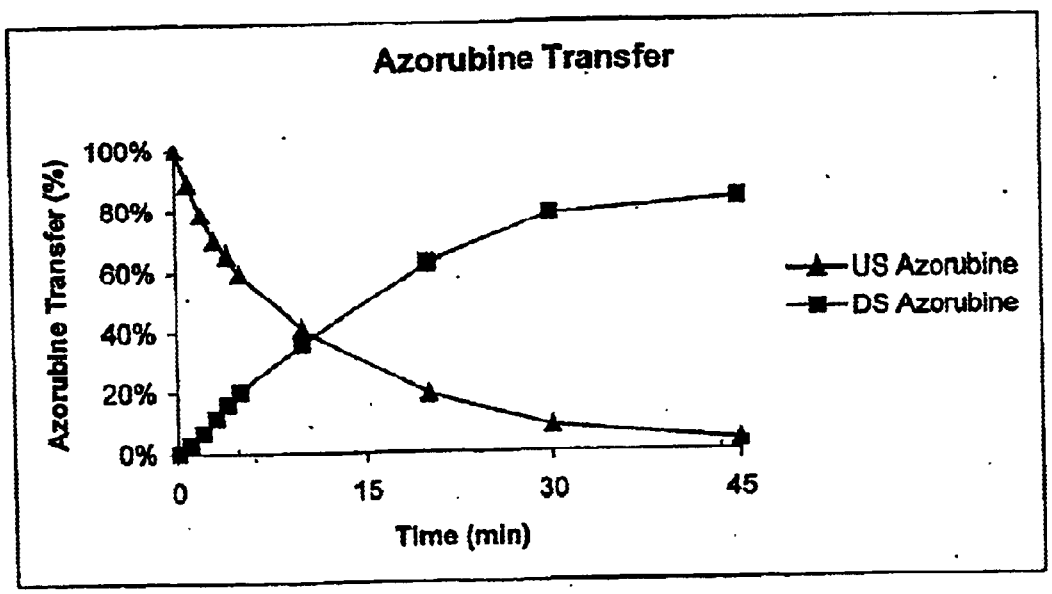
FIG. 6 shows the level of Azorubine in the sample stream (US) decreased over time and transferred to the product stream (DS). A total of 83% of the Azorubine was transferred and retained in 45 minutes.

Brilliant Blue FCF was readily transferred and retained in the product stream with the use of the 1 kDa Omega ultrafiltration membrane. This molecule is only 793 Da and so retention with a 1000 Da membrane would not be expected. The BB-FCF separation is represented by FIG. 5. Analysis of the BB-FCF separation was carried out using the absorbance at 630 nm.

Figure 1:
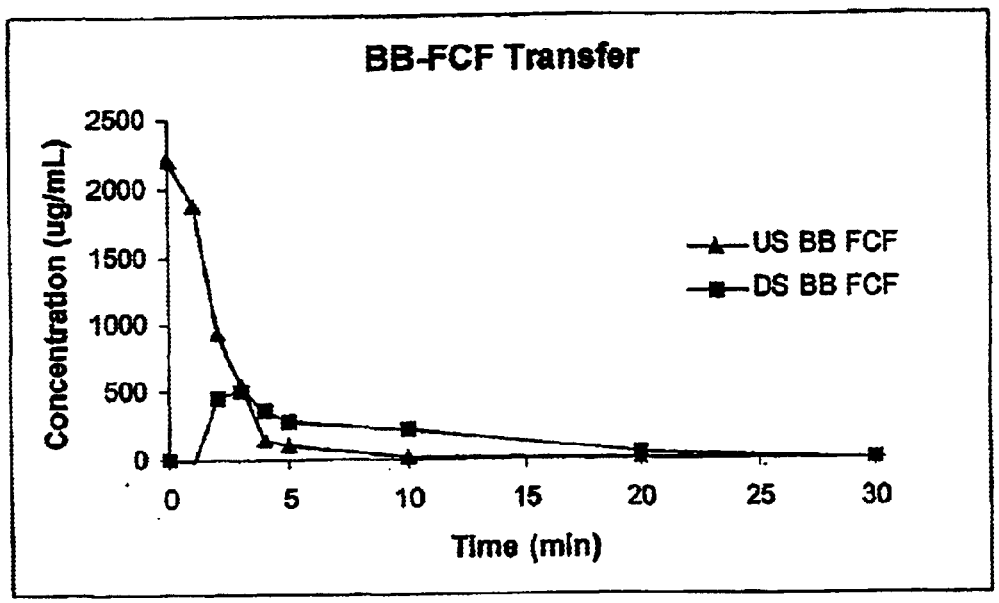
FIG. 1 shows the transfer of BB-FCF through the 5 kDa separation membrane from the sample stream (US) where it transiently builds up in the product stream (DS). After 20 minutes all the BB-FCF had transferred through the bottom restriction membrane into the buffer stream where it was lost.
Figure 2:
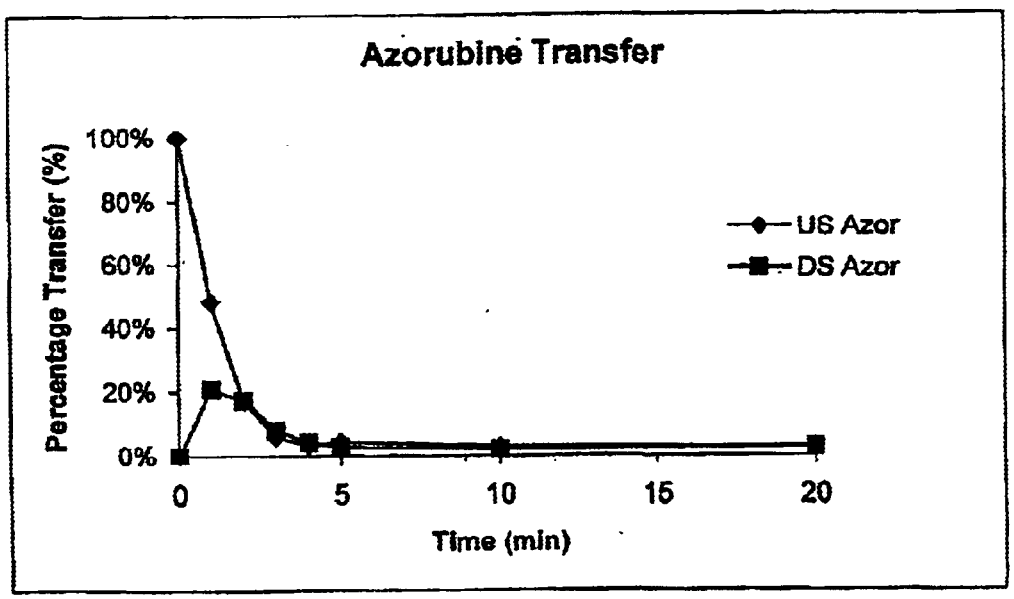
FIG. 2 shows Azorubine transfer using only polyacrylamide membranes in the Gradiflow system. Transfer from the sample (US) to the product stream (DS) occurred but the molecules only built up for a small period of time before moving completely into the buffer stream.
Figure 3:
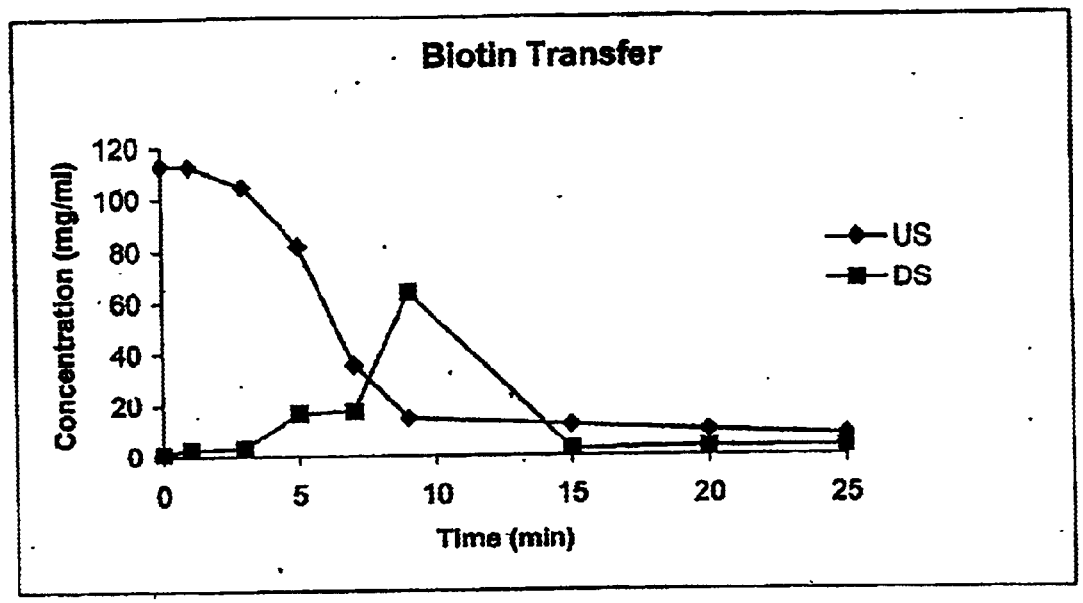
FIG. 3 shows that Biotin behaves in a similar manner to the other tested micromolecules in that it transferred rapidly from the sample stream (US) and appeared transiently in the product stream (DS) before eluting into the buffer stream.
Figure 4:
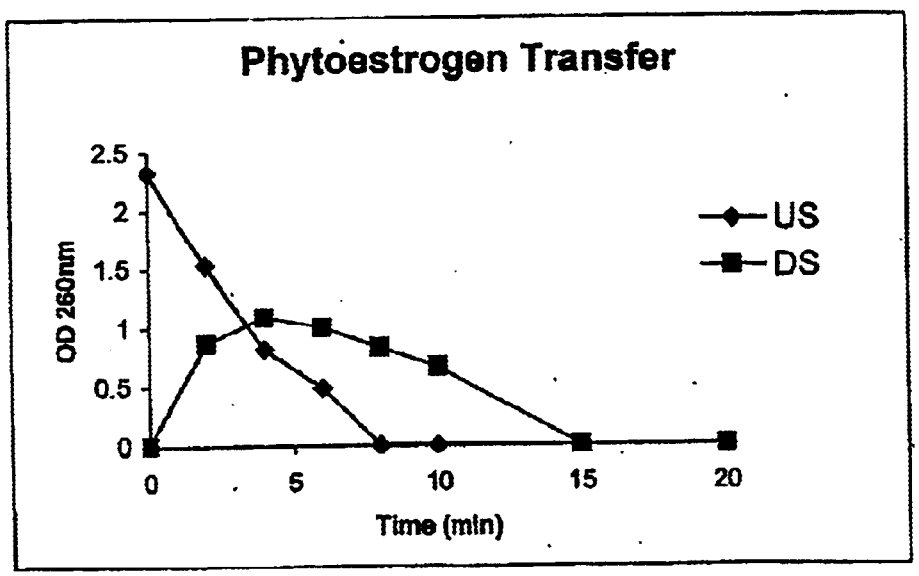
FIG. 4 shoes that phytoestrogen transferred into the product stream (DS) from the sample stream (US), where it built up and over time before dissipating into the buffer stream.

Azorubine was moved across the separation membrane and collected in the product stream. Using a pH 9.0 Tris-Borate buffer 83% of the Azorubine was transferred from the sample stream to the product stream within 45 minutes. This transfer was measured using the absorbance of Azorubine at 516 nm. The separation is illustrated in FIG. 4.

Figure 7:
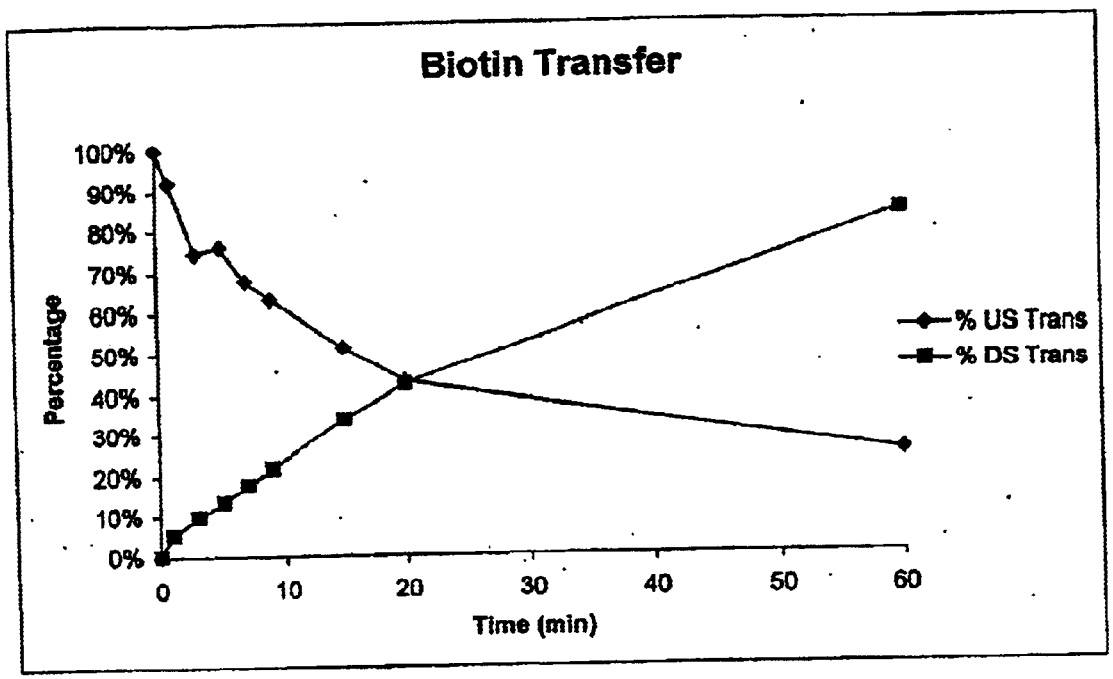
FIG. 7 shows Biotin was readily transferred from the sample stream into the product stream and collected with high yield (84%) in the product stream.
Figure 8:
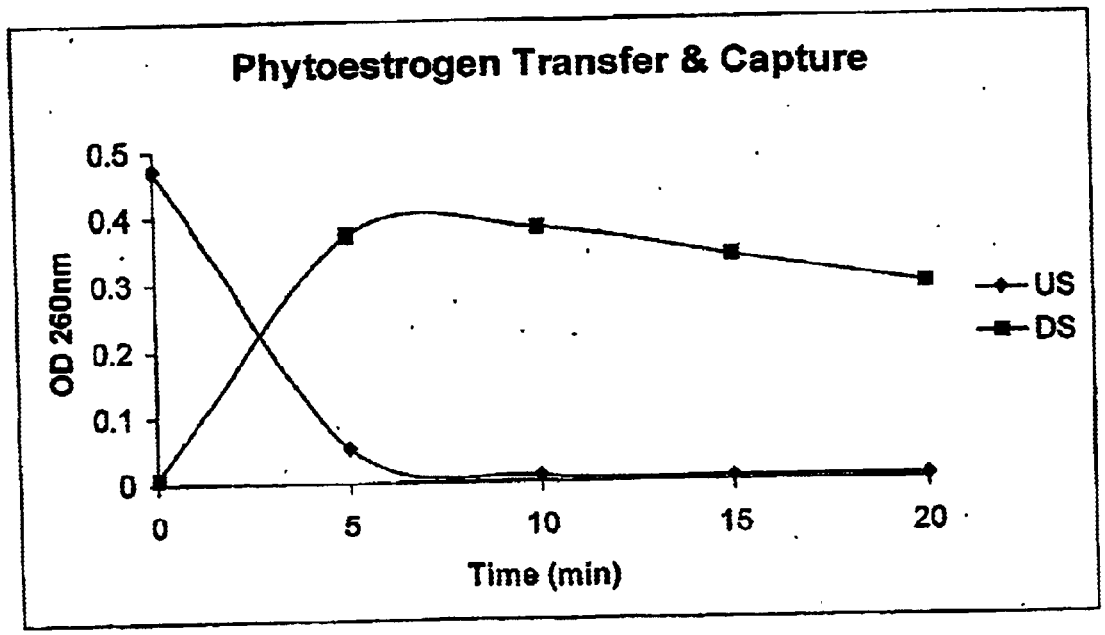
FIG. 8 shows phytoestrogen was transferred from the sample stream into the product stream where it could be collected.

The Biotin separation utilised a pH 9.0 buffer with the same cartridge configuration as that used for the BB-FCF and Azorubine. The transfer of this molecule was monitored using the absorbance at 230 nm. This experiment showed that the 1 kDa ultrafiltration membrane used could retain molecules as small as 244 Dalton. FIG. 7 shows that over 80% of the Biotin was transferred to the product stream where it was contained. The phytoestrogen transfer experiment depicted in FIG. 8 showed the movement and successful capture of phytoestrogen. The decrease over time after the initial high levels of phytoestrogen are most likely due to the fact that a 5 kDa ultrafiltration membrane was used as the bottom restriction membrane. The use of a 1 kDa ultrafiltration membrane would help to completely retain the small phytoestrogen.

Figure 9:
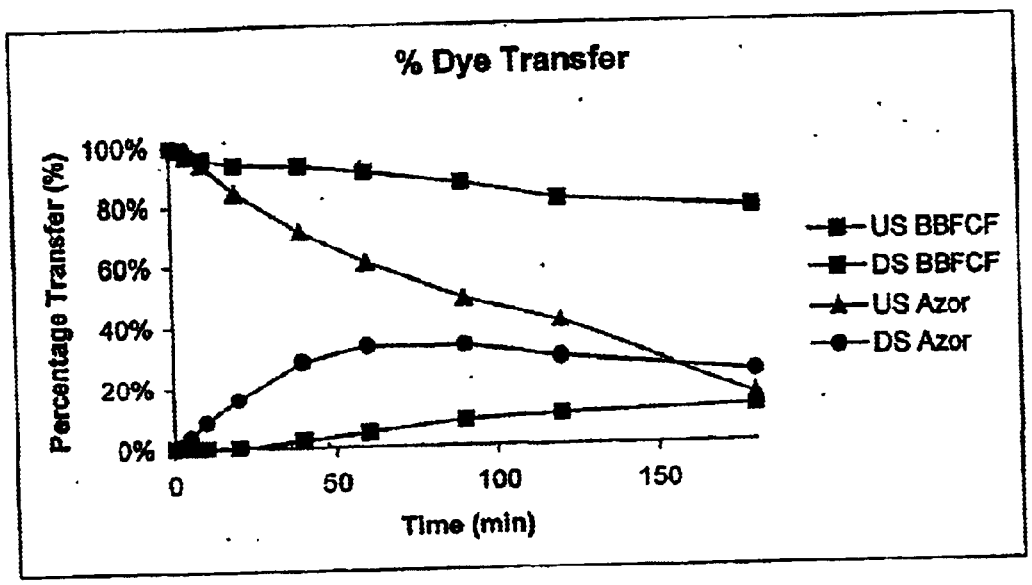
FIG. 9 shows separation of BB-FCF from Azorubine in a system adapted to carry out the method according to the present invention. The BB-FCF was retained in the sample stream whilst the Azorubine was moved to the product stream.

Not only could Azorubine and BB-FCF be moved across a separation membrane from sample stream to the product stream, these two molecules could also be separated from each other. With only 293 Da difference in size, the two compounds were separated from each other using a size exclusion separation where the largest molecule was retained in the product stream whilst the smaller molecule was allowed to transfer through into the buffer stream. The following cartridge configuration was used for the separation:

5 kDa polyacrylamide restriction membrane
Support Grid
3 kDa ultrafiltration separation membrane
5 kDa polyacrylamide separation membrane
Support Grid
1 kDa ultrafiltration restriction membrane
5 kDa polyacrylamide restriction membrane BB-FCF was separated from Azorubine. By allowing Azorubine to pass through the 3 kDa ultrafiltration membrane whilst retaining the BB-FCF in the sample stream, an adequate separation was achieved. The concentration of Azorubine decreased significantly from the sample stream but did not build up substantially in the product stream. This was due to loss into the buffer stream over time. The BB-FCF can pass through a 3 kDa membrane but only very slowly so separation of the two molecules was achieved. The movement of both molecules was monitored using 603 nm for BB-FCF and 516 nm for Azorubine. FIG. 9 shows the selective nature of the separation.

Figure 10:
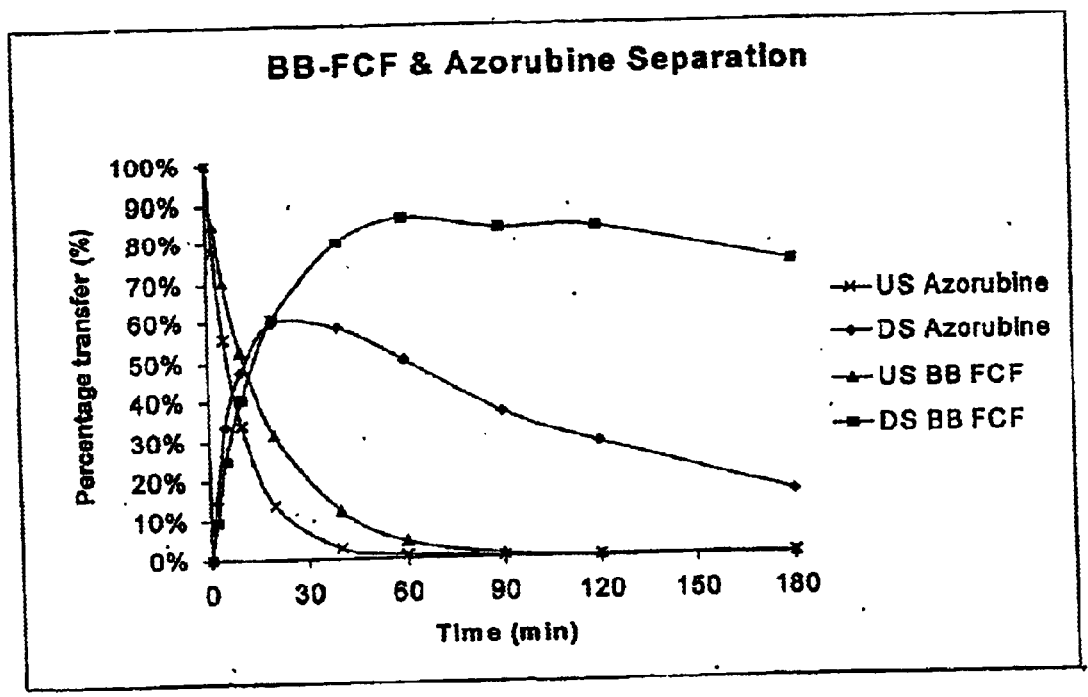
FIG. 10 shows BB-FCF was separated from Azorubine using a size exclusion approach with retention of 74% of the BB-FCF. Only a small percentage of the Azorubine remained with the BB-FCF after three hours of separation.

To improve the separation of BB-FCF from Azorubine a different cartridge configuration was utilised as follows:

5 kDa polyacrylamide restriction membrane
Support Grid
200 kDa polyacrylamide separation membrane
Support Grid
1 kDa ultrafiltration restriction membrane
5 kDa polyacrylamide restriction membrane This separation allowed both molecules to quickly transfer to the product stream from the sample stream. Then over time the Azorubine passed into the buffer stream, whilst the BB-FCF was retained. The fact that the Azorubine would transfer through the 1 kDa Omega ultrafiltration membrane enabled separation of Azorubine from BB-FCF more effectively than previously. FIG. 10 shows that after a three hour separation close to 74% of the BB-FCF was still present in the downstream whilst only 15% of the Azorubine remained. This separation shows the highly selective nature of the separation, which opens many possibilities for its use with a number of different molecular separations.

In new electrophoresis system it has been found that micromolecules under 5 kDa can be separated with this technology. When the polyacrylamide membranes are used in combination with certain commercially available membranes, molecules as small as 200 Da can be separated and purified.

There were several problems encountered in the separation of micromolecules using an unmodified electrophoresis system. Difficulty retaining micromolecules in the system has been overcome with the addition of combinations of membranes. However, these membranes themselves posed problems in that they are not designed to retain liquids and can produce large levels of electro-endo-osmosis. The liquid retention problem has been solved by backing the membranes with the hydrogel polyacrylamide membranes, which also helped to reduce the electro-endo-osmosis levels.

Several examples demonstrating the capability of the present invention in separating micromolecules have been shown though many other possible micromolecules of commercial interest do exist. For example this technology could be used in the separation and purification of cytokines and growth factors for use in the pharmaceutical and research industries. Currently cytokines and growth factors account for over 50% of the biotechnology based pharmaceutical product sales. Other areas where the use of the present technology could improve current separation strategies and be of substantial commercial benefit include purification of pharmaceutical drugs, food additives, agro-chemicals and fine chemicals.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. An electrophoretic separation apparatus for separating micromolecules having a molecular mass from about 100 to 5000 Da, the apparatus comprising:

(a) an anode;
(b) a cathode disposed relative to the anode so as to be adapted to generate an electric field in an electric field area therebetween upon application of a voltage potential between the anode and the cathode;
(c) a separation membrane disposed in the electric field area;
(d) a first restriction membrane disposed between the anode and the separation membrane so as to define a first interstitial volume therebetween;
(e) a second restriction membrane disposed between the cathode and the separation membrane so as to define a second interstitial volume therebetween; and
(f) means adapted to provide a sample constituent in a selected one of the first and second interstitial volumes; wherein upon application of the voltage potential, a selected separation product is removed from the sample constituent, thorough the separation membrane, and provided to the other of the first and second interstitial volumes and wherein a micromolecule is capable of being retained in at least one of the interstitial volumes, wherein at least one membrane is formed as a composite arrangement of at least two materials forming a barrier to substantial movement of water.

2. The electrophoretic separation apparatus of claim 1 wherein at least one of the membranes is comprised of at least two membranes in a sandwich arrangement having defined pores sizes.

3. The apparatus according to claim 2 wherein the sandwich arrangement includes an inner layer comprising a membrane having a pore size with a molecular mass cut-off less than the about 5000 Da and an outer layer comprising a membrane having a molecular mass cut-off of greater than about 5000 Da.

4. The apparatus according to claim 3 wherein the inner layer is made from an ultrafiltration, electrodialysis or haemodialysis membrane material and the outer layer is a membrane material made from polyacrylamide.

5. The apparatus according to claim 4 wherein the ultrafiltration membrane has a molecular mass cut-off between 200 Da and 5000 Da.

6. The apparatus according to claim 5 wherein the ultrafiltration membrane has a molecular mass cut-off of about 1 kDa.

7. An apparatus for electrophoretic separation of micromolecules having a molecular mass from about 100 to 5000 Da, comprising:
(a) an anode buffer compartment and a cathode buffer compartment;
(b) electrodes positioned in the buffer compartments;
(c) a first chamber and a second chamber positioned on either side of an ion-permeable separation membrane having a defined molecular mass cut-off, the first chamber and the second chamber being positioned between the anode and the cathode buffer compartments and separated by an ion-permeable restriction membrane positioned on at least one side of the separation membrane, the restriction membrane allowing flow of ions into and out of the compartments and chambers under the influence of an electric field but restrict movement of at least one micromolecule type from the second chamber into the cathode or anode- compartment, wherein at least one membrane is formed as a composite arrangement of at least two materials forming a barrier to substantial movement of water.

8. The apparatus according to claim 7 wherein the ion-permeable separation membrane has a molecular mass cut-off greater than the molecular mass of the micromolecule to be separated.

9. The apparatus according to claim 7 wherein at least one of the cathode or anode compartment, first chamber or second chamber is configured to allow flow of the respective buffer, sample or product solution to form a stream.

10. The apparatus according to claim 9 wherein at least one restriction barrier is formed as a sandwich arrangement with at least two layers of material.

11. The apparatus according to claim 10 wherein the sandwich arrangement includes an inner layer comprising a membrane having a pore size with a molecular mass cut-off less than the about 5000 Da and an outer layer comprising a membrane having a molecular mass cut-off of greater than about 5000 Da.

12. The apparatus according to claim 11 wherein the inner layer is made from an ultrafiltration, electrodialysis or haemodialysis membrane material and the outer layer is a membrane material made from polyacrylamide.

13. The apparatus according to claim 12 wherein the ultrafiltration membrane has a molecular mass cut-off between 100 Da and 5000 Da.

14. The apparatus according to claim 13 wherein the ultrafiltration membrane has a molecular mass cut-off of about 1 kDa.

15. The apparatus according to claim 7 wherein the ion-permeable separation membrane is made from polyacrylamide and having a molecular mass cut-off from about 5 to 1000 kDa.

16. A method of using an apparatus according to claim 7 for separating a micromolecule having a molecular mass from about 100 to 5000 Da from a liquid sample, comprising:
(a) placing the sample in the first chamber of the apparatus;
(b) selecting a solvent for the first chamber having a pH such that the micromolecule to be separated is charged;
(c) applying an electric potential between the first and second chambers causing movement of micromolecules in the first stream through the separation membrane into the second chamber while unwanted molecules are substantially prevented from entering the second chamber;
(d) optionally, periodically stopping and reversing the electric potential to cause movement of molecules having entered the separation membrane to move back into the first chamber, while substantially not causing any micromolecules that have entered the second chamber to re-enter first chamber; and
(e) maintaining steps (c) and optionally (d) until the desired amount of micromolecules are moved to the second chamber.

17. The method according to claim 16 or 23, further including the step of selecting a liquid sample containing a micromolecule selected from the group consisting of biotin, Brillian Blue FCF (BB FCF), azorubine, phytoestrogen, digoxigenin, hormones, cytokines, dyes, vitamins, chemicals, neutraceuticals, pharmaceuticals, food diet supplements, and combinations thereof.

18. The method according to claim 16 or 23, further including the step of selecting a liquid sample from the group consisting of crude extracts, microbial cultures, cell lysates, cellular products, chemical processing mixtures, cell culture media, plant products or extracts.

19. The method according to claim 16 further including the step of selecting a Tris Borate buffer around pH 9 as a solvent.

20. The method according to claim 19 further selecting a buffer that has a concentration of 10 mM to 200 mM.

21. The method according to claim 20 further selecting a buffer that has a concentration of 20 mM to 80 mM.

22. A method of using an apparatus according to claim 7 for separating a micromolecule having a molecular mass from about 100 to 5000 Da from a liquid sample, the method comprising:
   (a) placing the sample in the first chamber of the apparatus;
   (b) selecting a solvent for the first chamber having a pH such that the micromolecule to be separated have a desired charge or are uncharged;
   (c) applying an electric potential between the first and second chambers causing movement of unwanted molecules in the first chamber through the separation membrane into the second chamber while micromolecules are substantially prevented from entering the second chamber;
   (d) optionally, periodically stopping and reversing the electric potential to cause movement of micromolecules having entered the separation membrane to move back into the first chamber, while substantially not causing any unwanted molecules that have entered the second chamber to re-enter first chamber; and
   (e) maintaining steps (c) and optionally (d) until the desired amount of micromolecules are retained the first chamber.

* * * * *